United States Patent [19]

Nibby, Jr. et al.

[11] 3,760,379

[45] Sept. 18, 1973

[54] APPARATUS AND METHOD FOR MEMORY REFRESHMENT CONTROL

[75] Inventors: Chester M. Nibby, Jr., N. Billerica; John C. Manton, Marlboro; John L. Curley, Sudbury; Benjamin S. Franklin, Boston, all of Mass.

[73] Assignee: Honeywell Information Systems Inc., Waltham, Mass.

[22] Filed: Dec. 29, 1971

[21] Appl. No.: 215,736

[52] U.S. Cl. .......... 340/173 R

[51] Int. Cl. .......... G11c 7/00

[58] Field of Search .......... 340/173 R, 173 CA, 340/172.5

[56] References Cited

UNITED STATES PATENTS

| | | | |
|---|---|---|---|
| 3,713,114 | 1/1973 | Linton | 340/173 R |
| 3,636,528 | 1/1972 | Morris | 340/173 FF |
| 3,541,530 | 11/1970 | Spampinato | 340/173 R |
| 3,514,765 | 5/1970 | Christensen | 340/173 R |

*Primary Examiner*—Bernard Konick
*Assistant Examiner*—Stuart N. Hecker
*Attorney*—Nicholas Prasinos et al.

[57] ABSTRACT

Apparatus and method for controlling the refreshing of volatile memory elements associated with data processing units. The invention minimizes the conflict between the memory refresh operation and the requirements for access to the memory elements during data processing operations. When conflict is unavoidable, it is resolved in favor of the refresh cycle to prevent loss of information. In memory elements of the type which are automatically refreshed during utilization by the data processing unit, a separate refresh cycle is eliminated when the utilization takes place in an appropriate interval.

9 Claims, 4 Drawing Figures

INVENTORS
CHESTER M. NIBBY, JR.
JOHN C. MANTON
JOHN L. CURLEY
BENJAMIN S. FRANKLIN
BY Nicholas Prasinos
ATTORNEY INVENTORS
CHESTER M. NIBBY, JR.
JOHN C. MANTON
JOHN L. CURLEY
BENJAMIN S. FRANKLIN
BY
Nicholas Prasinos
ATTORNEY

APPARATUS AND METHOD FOR MEMORY REFRESHMENT CONTROL

BACKGROUND OF THE INVENTION

1. Field of the Invention

This invention pertains to memory elements associated with data processing units. More particularly, consideration is given to that class of memory elements in which the storage of information is maintained by physical properties which are subject to deterioration. If the deterioration is allowed to continue for a sufficient time, the information stored in such an element will be irretrievably lost. Thus, the physical property, which is the analog of the information, must be periodically restored. The problem is complicated because the restoration of the memory elements of an entire module to the appropriate physical state in one operation may be undesirable. It is therefore necessary to arrange the refreshment of the memory module into several cycles involving groups of memory elements. However, this multiplicity of refresh cycles increases the potential for conflict which arises between the use of the memory module by the data processing unit and the requirement that the memory elements must be refreshed periodically.

An example of the type of cell which must be periodically refreshed is the metal-oxide-semiconductor (MOS) memory elements. The memory elements themselves are typically composed of several interacting devices in which the information is maintained in the form of stored charge. Because of the leakage currents and other effects, this charge must be periodically restored to prevent loss of the information.

2. Description of the Prior Art

It is known in the art to restore volatile memory elements on a strictly periodic time base, accomplished at predetermined time intervals. During the restoration or refresh cycle, the memory elements of the entire module are rendered unavailable for manipulation by the data processing unit. A periodic restoration is convenient for use with synchronous machines, in which appropriate time periods can be reserved for the restoration of physical state. However, it is frequently desirable to run components of a data processing unit asynchronously. In each case, the conflicts which arise as to the availability of the memory elements must be resolved in favor of the refresh cycle. Moreover, the necessity for a refresh cycle renders the memory module unavailable to the data processing unit during certain intervals.

It is therefore an object of this invention to provide apparatus and procedure for refreshing memory elements in a manner so as to allow minimum conflict with the requirements of the data processing unit.

SUMMARY OF THE INVENTION

This aforementioned object is achieved by providing an interval of time during which a group of memory elements may be refreshed only if a memory module is not in use by the data processing unit. If a suitable period does not occur during the interval, than a second interval is provided during which a refresh cycle must be accomplished at the expense of any conflicting requirement of the data processing unit.

This object may also be achieved, for modules containing memory elements of the type refreshed by any operation imposed on them by the data processing unit, by disabling the refresh cycle apparatus for the remainder of the period reserved for refreshing the selected group of memory elements in the event that group has been accessed by the data processing unit.

DESCRIPTION OF THE PREFERRED EMBODIMENT

Figure 1:
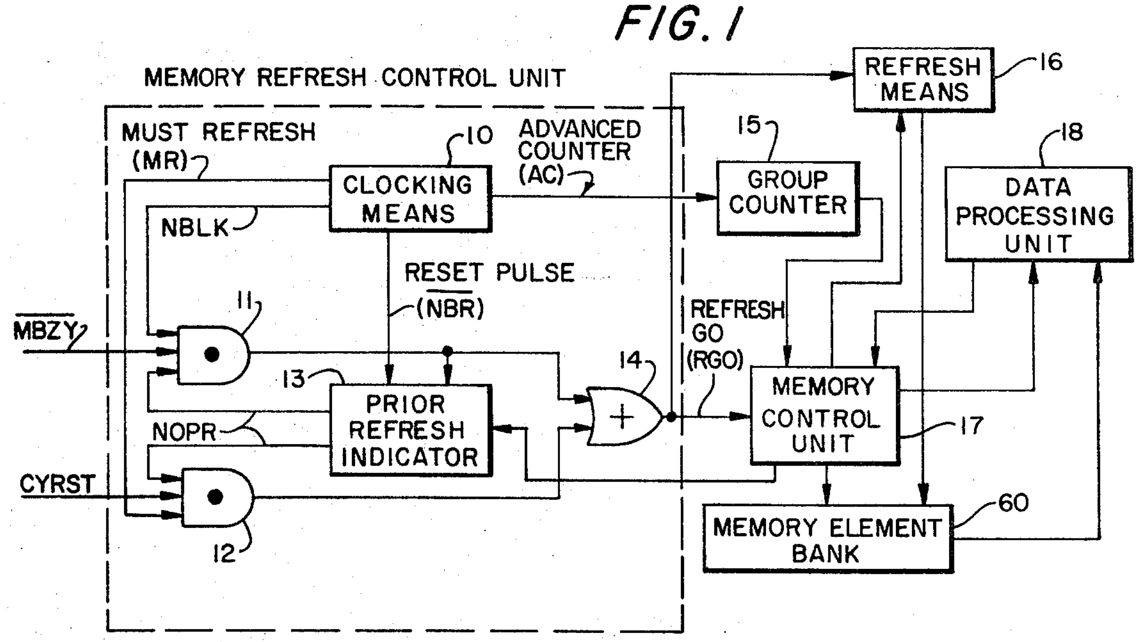
FIG. 1 is a block diagram showing an outline of the memory refresh operation.

The period of time within which restoration of the physical state of a memory element must take place to avoid loss of information stored therein is denoted by T. In the metal-oxide-semiconductor memory, the period T is typically 2 milliseconds, the value which shall be used for illustrative purposes. The time of refresh cycle for each memory element is typically 800 nanoseconds. In the preferred embodiment, the elements of the memory module have been divided into 32 groups. Each group of memory elements comprises a selected column of memory elements from an array of integrated circuit memory chips. Conflict between the refresh cycles and the requirements of the data processing unit for the memory module can occur $32 \times 800 \times 10^{-9}/2 \times 10^{-3} \times 100 = 1.28$ percent of the time, assuming that each group of elements is refreshed every 2 milliseconds and thereby conflicts with a requirement for continuous access of the memory module by the data processing unit.

According to the present invention, the interval between refresh cycles is not fixed but takes place in a time interval allotted for the refreshment of each group of memory elements. To accommodate the worst case each of the 32 groups must be allotted an interval $T/32 + 1 = 60.6$ microseconds, to ensure that for each group of memory elements the time between refresh cycles does not exceed 2 milliseconds.

The present invention divides the interval available for the refresh cycle of a given group of memory elements into two subintervals. During the first subinterval, the refresh cycle is initiated only when status signals indicate that the memory module is neither presently in use nor reserved for future operation. In the preferred embodiment, 57.6 $\mu$s of each 60.6 $\mu$s interval have been allotted to find a suitable free period to perform the refresh operation.

If a refresh cycle has not been initiated by the end of the 57.6 $\mu$s, a refresh cycle is automatically initiated at the conclusion of the access of the memory module by the data processing unit occurring at the conclusion of the first subinterval. The data processing unit is disabled from interacting further with the memory module until the end of the memory refresh cycle for that interval. After the refresh cycle, a new group of memory elements is addressed and the process repeated during the next interval.

The operation of the refresh cycle is further illustrated by consideration of FIG. 1. Memory Element Bank 60, of that figure, comprises the array of memory elements. Refresh Means 16 and Data Processing Unit 18 each address a group of memory elements in the Memory Element Bank. The particular group of elements addressed by the Refresh Means is determined by the Memory Control Unit 17 in response to signals from Group Counter 15. Group Counter 15 is a counter which is advanced one position near the end of each interval in response to a pulse Advance Counter (AC), from Clocking Means 10. The group of memory elements in the Memory Element Bank addressed by the Data Processing Unit (i.e., for the purpose of delivery of the stored information) is determined by the Memory Control Unit 17 in response to signals from the Data Processing Unit. The Memory Control Unit, in addition to the address functi'n, comprises the timing and control circuits necessary for the manipulation of the semiconductor storage elements. The separation of the Refresh Means from the Memory Control Unit is an artificial one and is used here to facilitate explanation of the operation of the Memory Refresh Control Unit. Typically, the circuits of the Refresh Means are incorporated in the Memory Control Unit and, because of overlapping functions, are not separable from it. The Memory Control Unit is also coupled to the Data Processing Unit for signalling to that unit, the non-availability of the Memory Element Bank (e.g., during a refresh cycle).

Group Counter 15 is set so that the Refresh Means, upon receipt of a Refresh Go (RGO) signal from the Memory Control Unit, initiates the refresh cycle for the selected group of memory elements. To initiate the RGO signal, Clocking Means 10 applies a Non-Busy Look (NBLK) signal to the logic "AND" gate 11 during the 57.6 $\mu$s period in which a non-busy period of the Memory Element Bank, is sought. A Memory Busy (MBZY) signal, originating in the Memory Control Unit or elsewhere, is complemented and the signal complement, denoted by $\overline{\text{MBZY}}$, is applied to another terminal of logic "AND" gate 11. In the following discussion a binary "1" signal is called a positive logic signal, while the complement, the binary "O" is called a zero logic signal. Positive logic signals are required to activate logic elements. A No Prior Refresh (NOPR), which is produced by the Prior Refresh Indicator 13, is applied to the final terminal of gate 11 and the NOPR signal is maintained as long as a refresh cycle has not previously occurred in the interval. Thus, $\overline{\text{MBZY}}$, NOPR, and NBLK signals applied to the input terminals of gate 11 result in a positive logic signal at the output of gate 11. The output terminal of gate 11 is coupled to one input terminal of "OR" gate 14. A positive logic signal from gate 11 will activate logic "OR" gate 14 causing gate 14 to generate a positive logic signal, RGO, at the output terminal, resulting in a refresh cycle for the group of memory elements determined by Group Counter 15. Further, the logic "AND" gate 11 is coupled to Prior Refresh Indicator 13, and a positive logic signal from gate 11 causes the output of Indicator 13 to be complemented from NOPR to $\overline{\text{NOPR}}$. The application of $\overline{\text{NOPR}}$ to gate 11, (a logic zero signal) disables gate 11 until the Prior Refresh Indicator is reset (i.e., to NOPR) by a Non-Busy Reset (NBR) signal. The output signal from Indicator 13, $\overline{\text{NOPR}}$, also disables logic "AND" gate 12, thereby assuring that the refresh cycle will not be repeated for the remainder of this interval.

However, if no refresh cycle has occurred after 57.6 $\mu$s, the NBLK signal is removed (i.e., changed to $\overline{\text{NBLK}}$) by Clocking Means 10, disabling gate 11 for the remainder of the interval. A Must Refresh (MR) signal is applied to one terminal of logic "AND" gate 12. A second terminal of gate 12 is enabled by the continued presence of the NOPR signal (i.e., the absence during the interval of a prior refresh cycle). A Cycle Reset (CYRST) pulse available near the end of a memory access cycle by the Data Processing Unit enables the remaining terminal of logic "AND" gate 12, causing a positive logic signal of the output terminal of gate 12. The output terminal of gate 12 is coupled to a second input terminal of the logic "OR" gate 14, so that the positive logic signal at the output of gate 12 produces the RGO signal at the output of gate 14. During this second subinterval, Clocking Means 10 removes the MR signal. Before the beginning of the next interval and the subsequent application of the NBLK signal enabling gate 11, a signal from Clocking Means 10 advances Group Counter 15. Group Counter 15 in turn, causes Memory Control Unit 17 to change the group of memory elements addressed by the Refresh Means. Thus, during the next interval, a new group of memory elements receives a refresh cycle from the refresh means.

The essential features of the operation of the preferred embodiment have been included in the above description. However, the detailed operation of the Memory Refresh Control Unit is more complex. For example, the "AND" gate 12 of FIG. 1 is realized by a circuit enabled by a MR pulse (not a logic signal) and is responsive to either a Memory Busy not ($\overline{\text{MBZY}}$) signal or to a Cycle Reset (CYRST) pulse.

Figure 2:
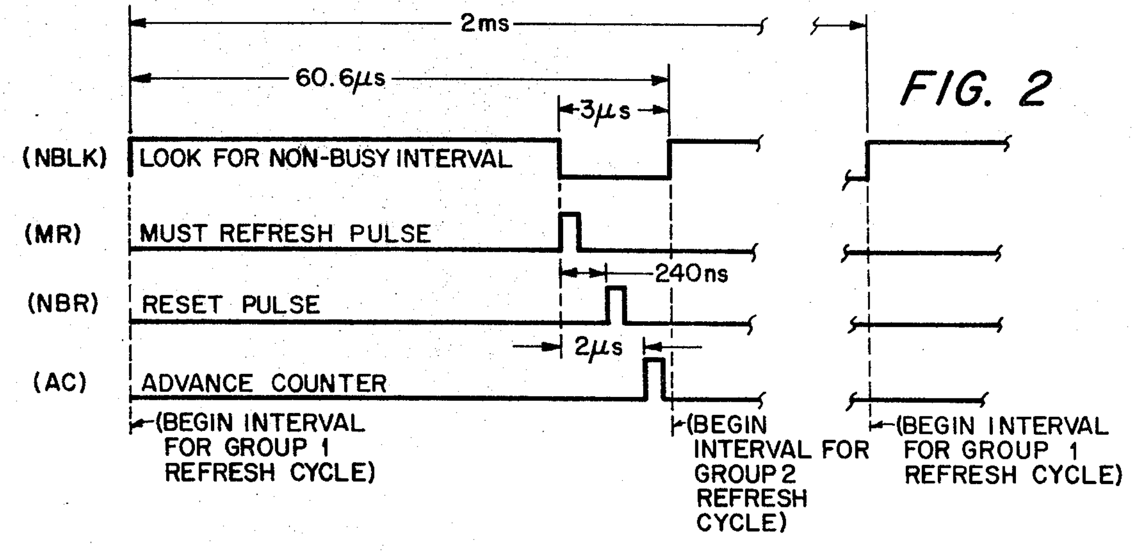
FIG. 2 is a drawing of the time sequence of the logic signals available from the clocking means for the control of the memory refresh operation in the preferred embodiment.

FIG. 2 displays the time sequence of the signals from the Clocking Means in the preferred embodiment. The NBLK signal is applied for 57.6 $\mu$s of the 60.6 $\mu$s interval and defines the period when the group of memory elements is refreshed during an available free period. After 57.6 $\mu$s, the NBLK signal is removed and a MR pulse is applied which enables the refreshment of the group of elements as soon as the present memory usage cycle is complete. At some time after the MR signal, a NBR signal resets the Prior Refresh Indicator, if the indicator is in the state producing the ($\overline{\text{NOPR}}$) signal which shows that a prior refresh cycle has taken place. In the preferred embodiment this signal occurs 240 ns after the MR pulse. Finally, the Clocking Means causes another group of elements to be addressed during the next refresh cycle interval by the AC pulse. This pulse is delivered, in the present embodiment, 2 $\mu$s after the MR signal, but the basic requirement is that the refresh cycle for this interval must be complete.

Figure 3:
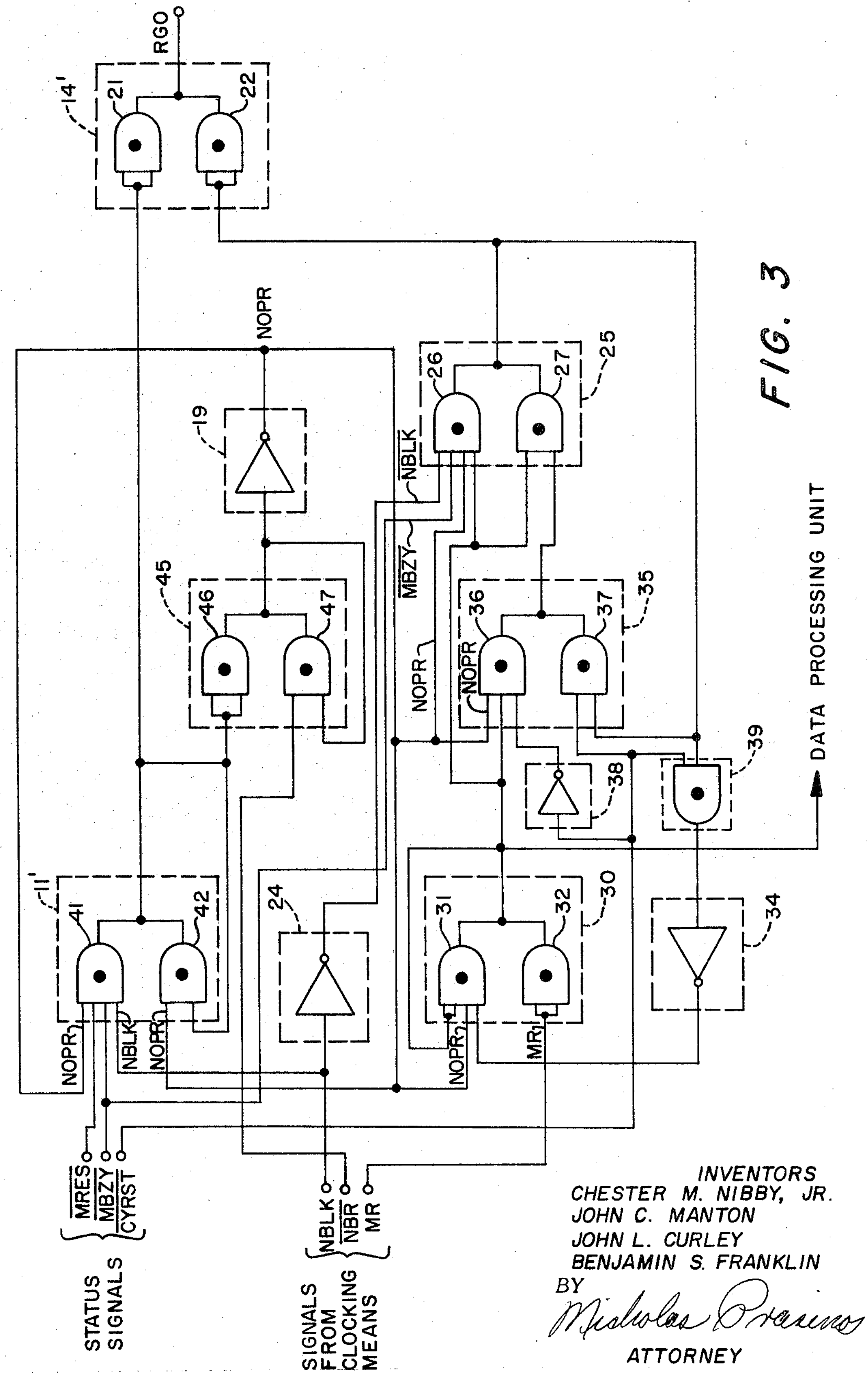
FIG. 3 is a detailed schematic diagram of the preferred embodiment of the memory refresh control unit.

Referring now to FIG. 3, the detailed circuit diagram of the preferred embodiment of the Memory Refresh Control Unit is shown. The signals from the clocking means are NBLK, $\overline{\text{NBR}}$, and MR and have been defined previously. The status signals are the MRES signal which presents a positive logic signal reserving the memory module for the next cycle, the CYRST signal which is pulse generated near the end of the memory address cycle and the MBZY signal, defined previously. In this figure, each of the areas enclosed by a dotted line describes a distinct element which is realized, in the present embodiment, by an integrated circuit unit. Elements 19, 24, 34 and 38 are logic inverting amplifier circuits. Elements 11', 14', 25, 30, 35, 39 and 45 are comprised of two logic "AND" gates. The output terminals of the two "AND" gates are coupled to the input terminal of a logic "AND" gate (not shown explicitly) and the output terminal of the "OR" gate is the output terminal of the element. Thus if either "AND" gate is enabled, a positive logic signal is present at the output terminal of the element. Implementation of these logic elements is described in, page 144 to 166, Chapter 4 of *Digital Electronics for Scientists* by H. V. Malmstadt and C. G. Enke, W. A. Benjamin Inc., New York, 1969.

Element 14' of FIG. 3 functions in the same manner as the "OR" gate 14 of FIG. 1. Positive logic signals delivered to the input terminals of either of the two logic "AND" gates 21 or 22 will result in a RGO signal at the output terminal of gate 14', which will activate the refresh cycle. Thus gate 14' and the associated circuit form a signal generator for producing a signal to initiate the refresh cycle. One input terminal of gate 21 is coupled to the output terminal of element 11'. Element 11' is comprised of two logic "AND" gates 41 and 42, the output terminals of which are coupled to a logic "OR" gate. The output terminal of the logic "OR" gate is the output terminal of element 11'. Clocking Means 10 signal NBLK, signals $\overline{MRES}$ and $\overline{MBZY}$ and the output signal of element 19 (the Prior Refresh Indicator), NOPR, are applied to the input terminals of logic "AND" gate 41. Therefore, when the memory module is not reserved, not busy and there has been no prior refresh, all occurring together with the Clocking Means signal NBLK (i.e., NBLK, NOPR, MRES, and MBZY are all positive logic signals), a positive logic signal will result at the output terminal of element 11'. The output signal of element 19, NOPR, and the output signal of element 11' are applied to the input terminals of logic "AND" gate 42 of element 11' to maintain or "latch" the output signal. When the NOPR signal is removed the output signal of "AND" gate 42 is removed, breaking the latch of the signal at the output terminal of element 11'.

The output terminal of element 11' is coupled to the input terminals of "AND" gate 46 of element 45. The output signal of "AND" gate 47 is "ORed" with the output signal of gate 46 to yield the output signal of element 45. The output terminal of element 45 is coupled to one input terminal of "AND" gate 47, the other terminal of "AND" gate 47 is coupled to the Clocking Means line $\overline{NBR}$. Thus output signal of 45 is latched on the signal $\overline{NBR}$ when there has been a first subinterval refresh cycle and this latch is broken when the pulse NBR appears (i.e., causing $\overline{NBR}$ to become a zero logic signal). The output terminal of element 45 is coupled to an input terminal of inverting amplifier element 19. The output signal of element 19 is the NOPR signal. This is a positive logic signal when there has been no prior refresh cycle and a zero logical signal when there has been a prior refresh. The portion of the circuit described above, thus implemnts the refresh control during the first 57.6 μs of the interval. A refresh cycle is initiated when the memory module is not busy and has not been previously refreshed in the 57.6 μus period.

When the group of memory elements addressed by the refresh means has not been refreshed during the first 57.6 μs of the interval, the positive NBLK logic signal is changed to a zero logic signal. A MR pulse is then applied which forces a refresh cycle during the remaining 3 μs of the interval. If the MR pulse occurs before the CYRST pulse of a memory access cycle, the refresh means is activated at the conclusion of that memory cycle. If the MR pulse occurs after the CYRST pulse, then activation of the refresh means results from the CRYST pulse occurring during a s memory, busy cycle. If a following memory access cycle does not follow immediately, then the resulting $\overline{MBZY}$ signal results in activation of the refresh means.

The activation of the refresh means by the MR pulse and the $\overline{MBZY}$ signal is considered first. The refresh cycle occurs when a positive logic signal is produced at the output terminal of element 25. An output signal from element 25 is in turn applied to the input terminals of "AND" gate 22 of element 14', and thereby initiates a RGO signal. Element 30 comprises "AND" gate 31 and "AND" gate 32, the output terminals of which are coupled to a logic "OR" gate. The output terminal of the logic "OR" gate is the output terminal of element 30. The MR signal is coupled to the input terminals of "AND" gate 32. The output terminal element 39 is coupled to the input terminal of inverting amplifier 34. The output signal of inverter 34, the output signal of element 30 and the NOPR signal are applied to the input terminals of "AND" gate 31. Thus when there has been no prior refresh cycle, the MR pulse will latch the output signal of element 30 so that a positive logic signal is maintained at the output terminal. If there has been a prior refresh cycle however, latching will not occur. The signal from element 30 is further applied to the data processing unit or other external circuits to reserve the memory module for the refresh cycle.

The output terminal of element 30 is coupled to input terminals of both "AND" gate 26 and "AND" gate 27 of element 25. "AND" gate 26 also has signals $\overline{NBLK}$ (i.e., the NBLK line coupled through inverting amplifier 26), NOPR and $\overline{MBZY}$ applied to the remaining terminals. Therefore during the 3 μs period of FIG. 2 following the MR pulse, as soon as the memory is no longer busy ($\overline{MBZY}$ is a positive logic signal) a signal appears at the output of 25 which initiates the RGO signal. The output terminal of element 25 is coupled to one input terminal of "AND" gate 39, the second input terminal of gate 39 is coupled to $\overline{CRYST}$ line. A positive logic signal at the output terminal of 25 and $\overline{CYRST}$ being a positive logic signal removes a latched signal at the output terminal of element 30.

The present embodiment provides for a refresh cycle to be initiated by the MR pulse and a CYRST pulse which is provided by the data processing unit near the end of a memory busy cycle by the data processing unit. Thus in FIG. 3, a $\overline{CYRST}$ line is coupled to "AND" gate 37 and inverting amplifier 38. The output terminal of amplifier 38 is coupled to an input terminal of "AND" gate 36. The output signal of element 35 is produced by "ORing" the output signal of gate 36 with the output signal of gate 37. The input terminal of gate 37 is coupled to the output terminal of element 25. Input terminals of "AND" gate 36 are also coupled to the output terminal of element 30 and the NOPR line. The output terminal of element 35 is coupled to an input terminal of "AND" gate 27. The operation of this circuit is as follows. After the MR pulse has latched a signal at the output of element 30 and there has been no prior refresh cycle, the CYRST pulse enables gate 36 and the resulting output signal from element 35 is applied to gate 27. Gate 27, enabled by the latched outut signal of element 30, causes a signal at the output of element 25 resulting in a positive RGO signal. The recirculation from the output terminal of element 25 to the input terminal of gate 37 provides a temporary latch until the positive logic signal at the output terminal of element 30 is removed.

Figure 4:
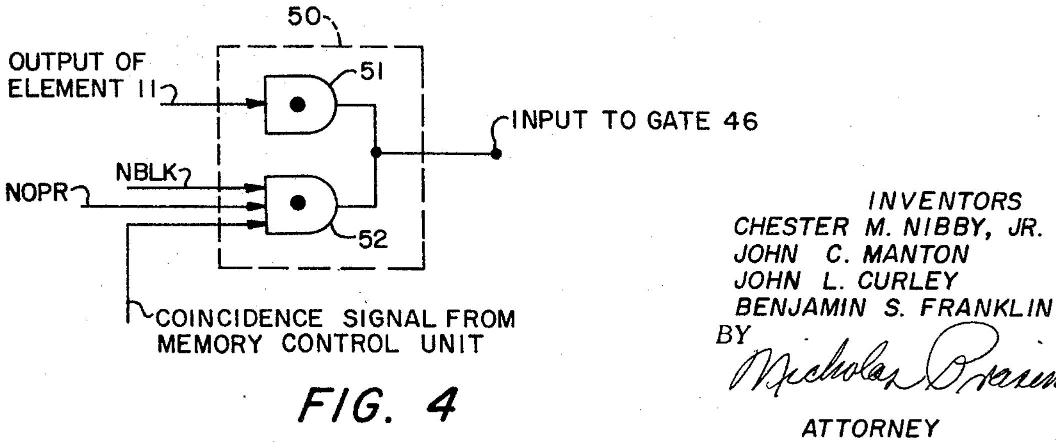
FIG. 4 is the additional circuitry necessary to disable the memory refresh control unit after the selected group of memory elements has been refreshed by a data processing operation.

The memory elements of the MOS type are frequently connected so that any operation required by the data processing unit will automatically refresh the element. Further, each group of elements is frequently connected so that the operation on any portion of elements refreshes the whole group. Therefore any activity involving the group of elements which are to be refreshed during the present interval eliminates the necessity for these elements to be refreshed. FIG. 4 shows a disabling circuit which prevents the Memory Refresh Control Unit from initiating a refresh cycle if the group of elements to be refreshed has been accessed previously by the Data Processing Unit. Element 50 is a device which contains a logic "AND" gate 51 and a logic "AND" gate 52, the output signals of which are "ORed" together to produce the output signal. The output terminal of element 11' is uncoupled from the input terminal of amplifier 46 and coupled to the input terminal of "AND" gate 51. The output terminal of element 50 is connected to the input terminal of amplifier 46. The prior discussion is still valid because gate 51 does not affect the above described operation. The terminals of "AND" gate 52 are coupled to the NOPR line, to the NBLK line, and to a line containing a signal registering the coincidence between the group of memory elements addressed by the Refresh Means and the group of memory elements accessed by the Data Processing Unit. In the case all of these signals are positive at the same time, the signal NOPR will be removed, preventing a further refresh cycle for the group of elements.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In a memory module associated with a data processing unit wherein information in groups of memory elements is to be refreshed by a refresh means, apparatus for controlling the refreshing of said groups of memory elements comprising:

a first control unit enabled during a first period to control said refresh means to refresh said information in said memory elements during an interval of said first period when said data processing unit does not require access to said memory elements; and a second control unit, enabled during a second period following said first period by a failure of said refresh means to refresh said information in said memory elements during said first period, to control said refresh means to refresh said information in said memory elements during an interval of said second period.

2. In a memory module associated with a data processing unit, apparatus comprising:

memory elements for storing binary signals;

controllable refresh means coupled to said memory elements for refreshing said binary signals in a selected group of said memory elements in response to a control signal;

control means, coupled to said memory elements and to said refresh means, for establishing said selected group addressed by said refresh means and for issuing said control signal, wherein said control signal is issued during an interval of a first period when said data processing unit does not require access to said selected group, wherein a non-issuance of said control signal during said first period causes said control signal to be issued during a second period following said first period, and wherein said refresh means addresses a different selected group after issuance of said control signal; and disabling means coupled to said control means, for preventing an issuance of said control signal for a remaining portion of said first period and said second period after access to said selected group by said data processing unit.

3. In a memory module associated with a data processing unit, the combination comprising:

memory elements for storing binary information;

controllable refresh means coupled to said memory element for refreshing said binary information in a selected group of said memory elements in response to an activation signal;

controllable address means coupled to said memory elements for determining said selected group of said memory elements in response to an address signal, wherein said address signal causes said address means to determine a different selected group of said memory elements;

signal means coupled to said refresh means and said address means for producing said activation signal and said address signal, during each of a series of intervals, said activation signal produced during a period of non-access of said memory module by said data processing unit in a first subinterval of each of said intervals, said activation signal produced during a second subinterval of each of said intervals when said period of non-access does not occur in said first subinterval;

clock means coupled to said signal means for establishing said intervals and for establishing said first subinterval and said second subinterval thereof; and apparatus for disabling said signal means from producing said activation signal during a portion of said interval remaining after said selected group is accessed by said data processing unit.

4. In a memory module associated with a data processing unit, a method for controlling activation of a refresh means for refreshing information in groups of memory elements, a one of said groups of memory elements selected by a memory control circuit, to be refreshed during an interval, comprising:

dividing said interval into a first and a second subinterval, said refresh means activated by a single activation signal during said interval;

generating said single activation signal during a period of non-activity of said memory module occurring during said first subinterval;

generating said single activation signal during said second subinterval at a conclusion of an access of said memory module occurring at a beginning of said second subinterval when said period of non-activity of said memory module does not occur during said first subinterval;

delivering a signal to said memory control circuit for selection of a new one of said groups of memory elements during a next interval; and disabling said refresh means for a remainder of said interval after said one of said groups of memory elements is accessed by said data processing unit.

5. A process for initiating a restoration of physical states of groups of volatile memory elements of a memory module, comprising the steps of:

initiating said restoration of an addressed one of said groups during a free period of said memory module, said free period occurring during a first part of an interval allotted for said restoration;

initiating said restoration of said addressed group during a second part of said interval when said free period is unavailable during said first part;

addressing a new one of said groups of memory elements; and repeating above steps so that said physical states of all of said memory elements are restored while said physical states can be determined.

6. In a memory module associated with a data processing unit wherein information in groups of memory elements is to be refreshed by a refresh means, apparatus for controlling a refreshing of said groups of memory elements comprising:

first control unit means coupled to said refresh means controlling said refreshing of said information in said groups of memory elements during a period of non-use of said groups;

second control unit means controlling said refreshing of said information in said groups of memory elements after a predetermined interval of continuous use of said groups, wherein periods for refreshing said groups of memory elements are divided in said predetermined interval and a second interval;

selection means to establish which one of said groups is to be refreshed; and clock means to determine said predetermined interval and said second interval, an enabling of said refresh means taking place during a total interval comprising said predetermined interval and said second interval.

7. Apparatus recited in claim 6, wherein said memory elements are metal-oxide-semiconductor units.

8. In a memory module associated with a data processing unit wherein information in groups of memory elements is to be refreshed by a refresh means, apparatus for controlling a refreshing of said groups of memory elements comprising:

first control unit means coupled to said refresh means controlling said refreshing of said information in said groups of memory elements during a period of non-use of said groups;

second control unit means controlling said refreshing of said information in said groups of memory elements after a predetermined period of continuous use of said groups; and means responsive to logic signals for activating said refresh means in a first part of an interval.

9. Apparatus recited in claim 8 including means responsive to other logic signals for activating said refresh means in a second part of said interval.

* * * * *